US012451286B2

(12) United States Patent
Wang et al.

(10) Patent No.: US 12,451,286 B2
(45) Date of Patent: Oct. 21, 2025

(54) PLANAR WINDING STRUCTURE FOR POWER TRANSFORMER

(71) Applicant: Delta Electronics, Inc., Taipei (TW)

(72) Inventors: Ruxi Wang, Cary, NC (US); Zhiyu Shen, Cary, NC (US); Chi Zhang, Apex, NC (US); Peter Mantovanelli Barbosa, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 1053 days.

(21) Appl. No.: 17/471,142

(22) Filed: Sep. 9, 2021

(65) Prior Publication Data

US 2022/0344092 A1 Oct. 27, 2022

Related U.S. Application Data

(60) Provisional application No. 63/179,784, filed on Apr. 26, 2021.

(51) Int. Cl.
*H01F 27/29* (2006.01)
*H01F 27/28* (2006.01)

(52) U.S. Cl.
CPC ......... *H01F 27/29* (2013.01); *H01F 27/2885* (2013.01)

(58) Field of Classification Search
CPC ................. H01F 27/29; H01F 27/2885; H01F 2027/2819; H01F 27/2804; H01F 27/32; H01F 27/324

(Continued)

(56) References Cited

U.S. PATENT DOCUMENTS

2003/0030533 A1* 2/2003 Waffenschmidt ...... H05K 1/165 336/200
2007/0001796 A1 1/2007 Waffenschmidt et al.
(Continued)

FOREIGN PATENT DOCUMENTS

CN 101055790 A 10/2007
CN 101140823 A 3/2008
(Continued)

OTHER PUBLICATIONS

J. Wang, A. Q. Huang, W. Sung, Y. Liu and B. J. Baliga, "Smart grid technologies," in IEEE Industrial Electronics Magazine, vol. 3, No. 2, pp. 16-23, Jun. 2009, doi: 10.1109/MIE.2009.932583.
(Continued)

*Primary Examiner* — Tuyen T Nguyen
(74) *Attorney, Agent, or Firm* — KIRTON McCONKIE; Evan R. Witt

(57) ABSTRACT

The present disclosure provides a printed circuit board (PCB) based planar winding structure for a main power transformer and/or an auxiliary power need. The PCB-based planar winding structure can confine electric field through magnetic core potential control and thus create partial discharge (PD) free design for medium voltage (MV) applications. Meanwhile, the winding structure can be formed in the PCB manufacturing process to create a more modular and reliable structure, thereby enhancing manufacturability. Techniques, such as termination treatment, primary and secondary winding arrangements, etc., can be used to control the electrical stress in the medium voltage applications.

13 Claims, 11 Drawing Sheets

(58) Field of Classification Search
USPC ............. 336/83, 84 R, 84 C, 84 M, 200, 232
See application file for complete search history.

(56) References Cited

U.S. PATENT DOCUMENTS

| | | | | | |
|---|---|---|---|---|---|
| 2011/0291792 | A1 | 12/2011 | Lu | | |
| 2013/0249662 | A1 * | 9/2013 | Tonoyama | .......... | H01F 17/0013 336/200 |
| 2019/0221359 | A1 | 7/2019 | Hung et al. | | |

FOREIGN PATENT DOCUMENTS

| | | | | | |
|---|---|---|---|---|---|
| CN | 202713788 | U | 1/2013 | | |
| CN | 103748643 | A | 4/2014 | | |
| CN | 104103408 | A | 10/2014 | | |
| CN | 206460860 | U | 9/2017 | | |
| CN | 209804426 | U | 12/2019 | | |
| CN | 211719406 | U | 10/2020 | | |
| CN | 112071583 | A | 12/2020 | | |
| CN | 112271058 | A | 1/2021 | | |
| EP | 0715322 | A1 | 6/1996 | | |
| JP | 2017118020 | A | 6/2017 | | |
| KR | 20200081195 | A | 7/2020 | | |
| WO | WO-2012093052 | A1 * | 7/2012 | ........... | H01F 27/324 |

OTHER PUBLICATIONS

D. Rothmund, G. Ortiz, T. Guillod and J. W. Kolar, "10kV SiC-based isolated DC-DC converter for medium voltage-connected Solid-State Transformers," 2015 IEEE Applied Power Electronics Conference and Exposition (APEC), Charlotte, NC, USA, 2015, pp. 1096-1103, doi: 10.1109/APEC.2015.7104485.

Q. Chen, etc "High Frequency Transformer Insulation in Medium Voltage SiC enabled Air-cooled Solid-State Transformers," 2018 IEEE Energy Conversion Congress and Exposition (ECCE), Portland, OR, USA, 2018, pp. 2436-2443, doi: 10.1109/ECCE.2018.8557849.

S. Zhao, Q. Li, F. C. Lee and B. Li, "High-Frequency Transformer Design for Modular Power Conversion From Medium-Voltage AC to 400 VDC," in IEEE Transactions on Power Electronics, vol. 33, No. 9, pp. 7545-7557, Sep. 2018, doi: 10.1109/TPEL.2017.2774440.

L. Heinemann, "An actively cooled high power, high frequency transformer with high insulation capability," APEC. Seventeenth Annual IEEE Applied Power Electronics Conference and Exposition (Cat. No.02CH37335), Dallas, TX, USA, 2002, pp. 352-357 vol.1, doi: 10.1109/APEC.2002.989270.

C. Loef, R. W. De Doncker and B. Ackermann, "On high frequency high voltage generators with planar transformers," 2014 IEEE Applied Power Electronics Conference and Exposition—APEC 2014, Fort Worth, TX, USA, 2014, pp. 1936-1940, doi: 10.1109/APEC.2014.6803571.

* cited by examiner

1310

PLANAR WINDING STRUCTURE FOR POWER TRANSFORMER

RELATED APPLICATION

This application claims the benefit of priority to U.S. Provisional Application No. 63/179,784, filed Apr. 26, 2021, the entire contents of which are incorporated herein by reference for all purposes.

TECHNICAL FIELD

The present disclosure relates to a planar winding structure for use in a power transformer. More particularly, the present disclosure relates to a planar winding structure for use in a power transformer for medium voltage applications.

BACKGROUND

Due to its increasing use in data center, EV charging, and other emerging applications, medium voltage distribution becomes more and more attractive for its lower conduction loss and potential smaller footprint. In medium voltage applications (e.g., from about 4 kV to about 13.8 kV), traditional approach requires a line frequency transformer that is bulky to step down medium voltage alternating current (MVAC) power source to lower voltage alternating current (AC) or direct current (DC) power source to be used directly by the load. To overcome the disadvantages of the line frequency transformer, Solid-State Transformer (SST) technology has been developed to utilize high frequency operation of semiconductor devices to create a high frequency pulse width modulation (PWM) AC link that can potentially reduce the footprint of the passive transformer because of the much lower applied volt-seconds. See, Ref. [1]. However, the high frequency passive transformer size reduction cannot be inversely proportional to the operating frequency because the reliable insulation is a must between the high voltage and low voltage windings. See, Ref. [2].

The goal for the medium voltage high frequency transformer design can be summarized as follows. First, the medium voltage transformer needs to be free from partial discharge (PD). Partial discharge is one of the most common degradation reasons in long term operation. This is especially true if insulation is made from polymer-based material. Being PD free assures the long-term service capability after deployment. Second, considering the cost and easier manufacturing, a modular solution and/or industry's long-term proven technologies are preferred. Third, the transformer needs to have higher efficiency and higher power density. The higher efficiency is a key performance indicator especially when comparing the solid-state solution with the traditional line-frequency solution. Meanwhile, because most of the insulation material's poor thermal conductivity, higher efficiency will also create less thermal stress on the transformer so the heat can be easily removed.

FIG. 1 illustrates a conventional litz wire potted transformer solution. See, Ref. [3]. In this solution, litz wire is utilized for both the primary side and the secondary side. Because litz wire is composed of multiple small strands insulated electrically from each other, the gap and bubble between the small litz wire strands is very difficult to be controlled during the potting process. Therefore, the combination between the litz wire and epoxy-based insulation is difficult to control the insulation quality, primarily because the epoxy-based insulation typically has high viscosity, and small voids between the litz wire strands are unavoidable. One solution is to use two layers of insulation material applied in two steps. Mold is required for the fabrication of the two layers. A low viscosity insulation material, e.g., a silicon-based insulator, can be used to form the first insulation layer. After the litz wire is placed into the mold, the silicon-based insulator can be applied. Due to its low viscosity, the silicon-based insulator can fill in the small gaps between different strands. Then, the silicon-based insulator is cured before being placed into a second mold for epoxy-based insulation, which has a higher viscosity and provides a better breakdown strength. There is no concern on the potential voids in the epoxy based insulator, because it does not contact the litz wire. After the sample is cured with the epoxy (main insulator) layer, extra shielding layer can be applied to the outside of the insulator to confine the electric field within the insulator. This solution is quite complicated and require multiple steps with customized mold to facilitate the curing process. It is also not a modular solution and is difficult to scale.

FIG. 2 illustrates another conventional transformer design that inserts a gap between the core and separates the transformer into two sections, a low voltage (LV) side and a high voltage (HV) side. See, Ref. [4]. In this solution, primary and secondary windings are set to be on the two sides of the transformer separated by a gap and an insulation therebetween. The two separated parts of the magnetic core no longer share the same or similar electrical potential. Because of the intentional gap between the cores, the insulation requirement between the high-voltage winding to the core on high voltage side or between the low-voltage winding to the core on low voltage side can be mitigated. However, other issues may undermine the benefits of this solution. First, because a gap is required to provide the major insulation, the electrical performance becomes coupled with the insulation performance in this design. For some resonant converter applications, the magnetic inductance of the transformer need to be controlled within a predefined range to achieve soft-switching and maintain smaller circulating energy. If the gap is too big, the magnetic inductance may be too small and therefore the circulating energy is too much for unnecessary conduction loss. Second, for some applications, such as, the IEC 60076-11 standard, this solution cannot be implemented, because the magnetic core needs to be grounded regardless of its high voltage side or low voltage side.

FIG. 3 illustrates a conventional solution of using a coaxial structure to form the transformer's primary and secondary sides. See, Ref. [5]. There are two benefits in this solution. First, the insulation is formed through the coaxial cable insulation. Accordingly, the insulation performance can be well controlled on the cable side and no more post process for the epoxy- or silicon-based potting is required. Second, there is another hollow space within the inner conductive layer of the cable. Therefore, liquid cooling is possible. The coolant can be flow into the pipe to remove the heat if needed. However, this solution also faces challenges. First, the inner pipe of the cable is made of rigid metal. To form the winding, the metal needs to be bent. Minimum bend ratio needs to be met to assure no crack on the insulation layer wrapping the conductor. This means it is difficult to form a shape that requires smaller bend ratio. Second, the coaxial structure is more suitable for 1:1 turn's ratio design. It is difficult to implement a design that requires step down or step up the voltage between the primary side and the secondary side which is quite common in medium voltage applications.

FIG. 4 illustrates a conventional solution of using a PCB board targeting for medium voltage applications. See, Ref. [6]. In this solution, primary and secondary winding are just regular spiral structure and stacked on each other to fill the window area of the core. Ref. [6] does not present any medium voltage operation results but mentions that this solution can be dipped into an oil tank for potential high voltage scenario. In medium voltage applications, however, dry type transformer is preferred for easier maintenance.

In view of the above, a modular and easy-to-manufacture solution is desired for medium voltage applications. The solution needs to be PD free with higher efficiency and better thermal capability. Lower noise coupling between the primary and secondary is also desirable.

REFERENCES

1. J. Wang, A. Q. Huang, W. Sung, Y. Liu and B. J. Baliga, “Smart grid technologies,” in IEEE Industrial Electronics Magazine, vol. 3, no. 2, pp. 16-23, June 2009, doi: 10.1109/MIE.2009.932583.
2. D. Rothmund, G. Ortiz, T. Guillod and J. W. Kolar, “10 kV SiC-based isolated DC-DC converter for medium voltage-connected Solid-State Transformers,” 2015 IEEE Applied Power Electronics Conference and Exposition (APEC), Charlotte, North Carolina, USA, 2015, pp. 1096-1103, doi: 10.1109/APEC.2015.7104485.
3. Q. Chen, etc “High Frequency Transformer Insulation in Medium Voltage SiC enabled Air-cooled Solid-State Transformers,” 2018 IEEE Energy Conversion Congress and Exposition (ECCE), Portland, OR, USA, 2018, pp. 2436-2443, doi: 10.1109/ECCE.2018.8557849.
4. S. Zhao, Q. Li, F. C. Lee and B. Li, “High-Frequency Transformer Design for Modular Power Conversion From Medium-Voltage AC to 400 VDC,” in IEEE Transactions on Power Electronics, vol. 33, no. 9, pp. 7545-7557, September 2018, doi: 10.1109/TPEL.2017.2774440.
5. L. Heinemann, “An actively cooled high power, high frequency transformer with high insulation capability,” APEC. Seventeenth Annual IEEE Applied Power Electronics Conference and Exposition (Cat. No. 02CH37335), Dallas, TX, USA, 2002, pp. 352-357 vol. 1, doi: 10.1109/APEC.2002.989270.
6. C. Loef, R. W. De Doncker and B. Ackermann, “On high frequency high voltage generators with planar transformers,” 2014 IEEE Applied Power Electronics Conference and Exposition—APEC 2014, Fort Worth, TX, USA, 2014, pp. 1936-1940, doi: 10.1109/APEC.2014.6803571.

SUMMARY

In one aspect, the present disclosure provides a planar winding structure, comprising: an insulating planar board having a winding portion and a terminal portion, with a through hole at a central portion of the winding portion; a plurality of conductive layers embedded in the winding portion of the insulating planar board and electrically connected with each other through one or more buries vias, the conductive layers being patterned to constitute a transformer winding around the through hole; first and second terminals at the terminal portion of the insulating planar board, each being electrically connected to a respective one of the conductive layers; and a shielding layer coated on outer surfaces of the winding portion of the insulating planar board in the winding portion.

In one embodiment, the planar winding structure further comprises a shielding edge treatment in the terminal portion between the shielding layer and the first and second terminals.

In one embodiment, the planar winding structure further comprises an electric bushing having a potted part and a hollow part, wherein the terminal portion of the insulating planar board is accommodated within the potted part.

In one embodiment, the electric bushing further comprises terminal blocks in the potted part to electrically and mechanically support the first and second terminals.

In one embodiment, the planar winding structure further comprises a grading ring structure embedded in the terminal portion of the insulating planar board.

In one embodiment, the grading ring structure comprises an external ground ring on an outer face of the insulating planar board proximate an interface of the winding portion and the terminal portion and an internal ground ring embedded in the insulating planar board and electrically connected with the external ground ring through one or more blind vias.

In one embodiment, the grading ring structure comprises a plurality of grading rings embedded in the terminal portion of the insulating planar board and extending in a horizontal direction from an interface of the winding portion and the terminal portion, and at least a resistor embedded in the insulating planar board and electrically connected to neighboring ones of the grading rings.

In one embodiment, one of the grading rings that is farthest from the interface is electrically connected to one of the first and second terminals.

In one embodiment, the planar winding structure further comprises EMI shielding layers embedded in the insulating planar board, wherein the conductive layers are embedded in the insulating planar board between the EMI shielding layers.

In one embodiment, the shielding layer comprises a semiconductive material.

In one embodiment, the insulating planar board comprises a FR4 material.

In another aspect, the present disclosure provides a power transforming comprising the planar winding structure described above, a magnetic core, and a secondary winding structure magnetically coupled to the planar winding structure through the magnetic core.

In one embodiment, a portion of the magnetic core is disposed in the through hole of the insulating planar board.

In one embodiment, the secondary winding structure is electrically connected to the shielding layer of the planar winding structure.

In still another aspect, the present disclosure provides a planar winding structure, comprising: an insulating planar board having a through hole at a central portion thereof to receive a magnetic core; a first winding disposed on the insulating planar board, the first winding wound around the through hole and proximate a periphery of the through hole; and a second disposed on the insulating planar board, the second winding wound around the through hole and spaced apart from the periphery of the through hole at a first distance and spaced apart from an edge of the planar winding structure at a second distance.

In one embodiment, the planar winding structure further comprises a third winding disposed on the insulating planar board, and the third winding wound around the through hole and proximate the edge of the insulating planar board.

In one embodiment, the first and second distances are the same.

In one embodiment, a percentage difference of the first and second distances is less than 20%.

In yet another aspect, the present disclosure provides a planar winding structure, comprising: an insulating planar board having first and second through hole to receive a magnetic core; a first high voltage winding disposed on the insulating planar board, the first high voltage winding wound around the first through hole and proximate a periphery of the first through hole; and a first low voltage winding disposed on the insulating planar board, the first low voltage winding wound around the second through hole and spaced apart from a periphery of the second through hole at a first distance.

In one embodiment, the planar winding structure further comprises: a second high voltage winding disposed on the insulating planar board, the second high voltage winding wound around the second through hole and proximate the periphery of the second through hole; and a second low voltage winding disposed on the insulating planar board, the second low voltage winding wound around the first through hole and spaced apart from the periphery of the first through hole at a second distance.

In one embodiment, the first and second low voltage windings are electrically connected in series.

DETAILED DESCRIPTION

High frequency transformers are critical components in medium voltage applications. In contrast to a conventional line-frequency transformer, a high frequency transformer leads to a smaller size and weight due to the power stage high frequency operation and smaller applied volt-seconds. The insulation design of high frequency transformers is critical and needs to cope with the design targets, such as, partial discharge free, easy fabrication, higher efficiency, better thermal performance, etc.

In the present disclosure, a technique of printed circuit board (PCB) based planar structure transformer is provided to form both a main power transformer and an auxiliary power transformer. Embodiments of the present disclosure can provide confined electric field through magnetic core potential control and thus create partial discharge (PD) free design for medium voltage (MV) applications. Meanwhile, the winding structure can be formed through the PCB manufacturing process to create a more modular and reliable structure, thereby enhancing manufacturability. Techniques, such as termination treatment, primary and secondary winding arrangements, etc., can be used to control the electrical stress in the medium voltage applications.

Two types of transformers may be used in MV applications. The first type is a main power transformer. As mentioned above, the main power transformer is utilized to replace the traditional line frequency transformer. Therefore, all the power delivered from the high voltage (primary) side to the low voltage (secondary) side needs to flow through the main power transformer. The second type transformer is an auxiliary power transformer, which is utilized in an auxiliary power application for the high voltage side, such as, gate driver power, sensor power or other bias power needed for a rectifier converter or a DC-DC converter.

For the main power transformer, high voltage is typically applied to the primary side and after the step-down function, the low voltage output of the transformer is connected to the secondary side. Therefore, the primary high voltage side winding requires high voltage and low current design, while the secondary side winding requires low voltage and high current design. In the present disclosure, a PCB based high voltage winding solution is provided.

Figure 1:
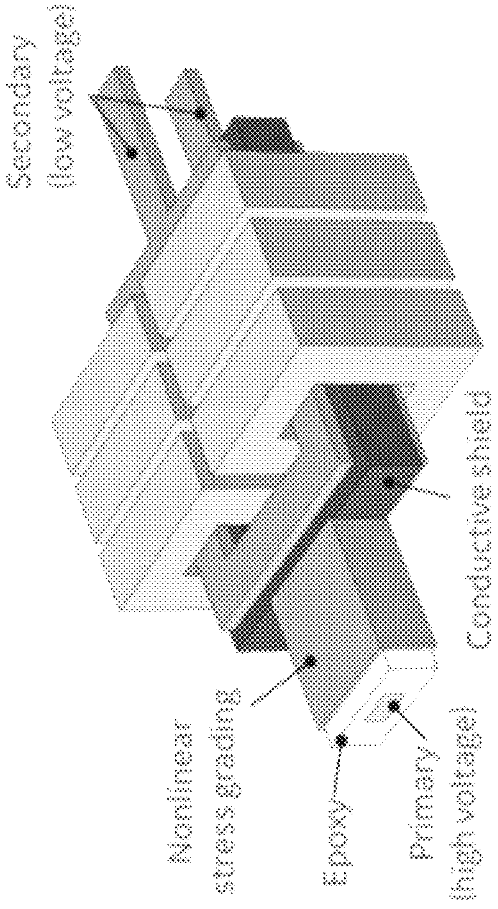
FIG. 1 (Prior Art)
FIG. 1 illustrates a conventional litz wire potted transformer solution.
Figure 2:
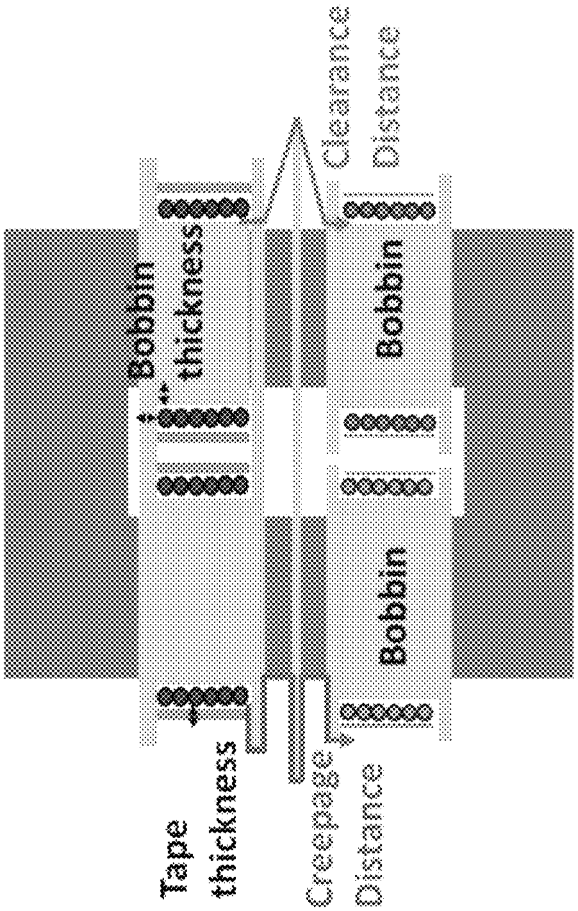
FIG. 2 (Prior Art)
FIG. 2 illustrates another conventional transformer design that inserts a gap between the core and separates the transformer into two sections, an LV side and an HV side.
Figure 4:
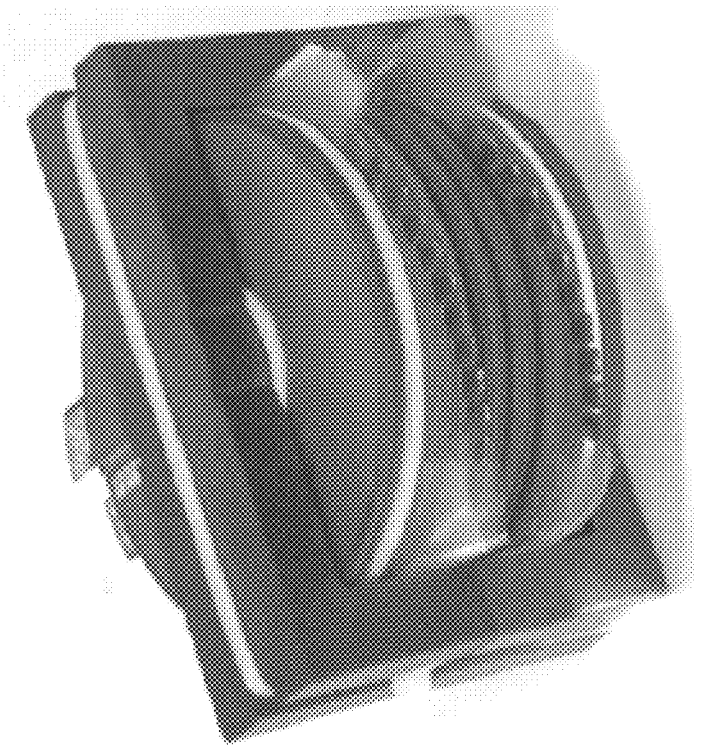
FIG. 4 (Prior Art)
FIG. 4 illustrates a conventional solution of using a PCB board targeting for medium voltage applications.
Figure 3:
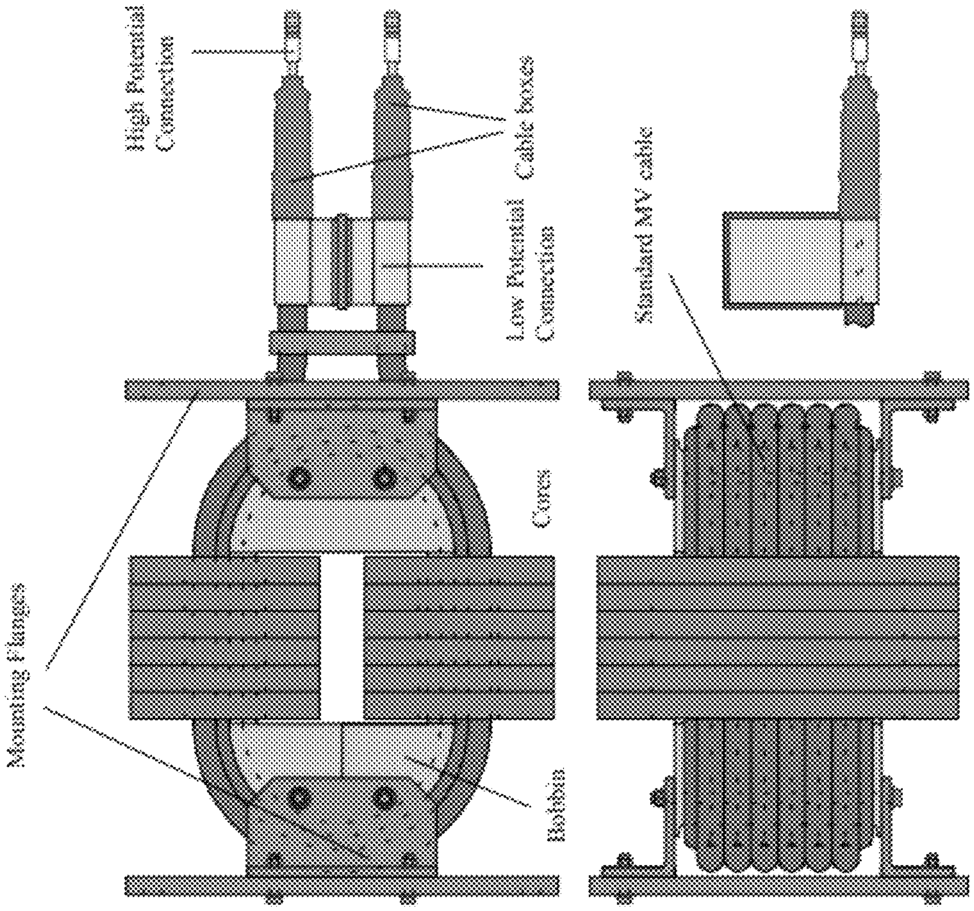
FIG. 3 (Prior Art)
FIG. 3 illustrates a conventional solution of using a coaxial structure to form the transformer's primary and secondary sides.
Figure 5:
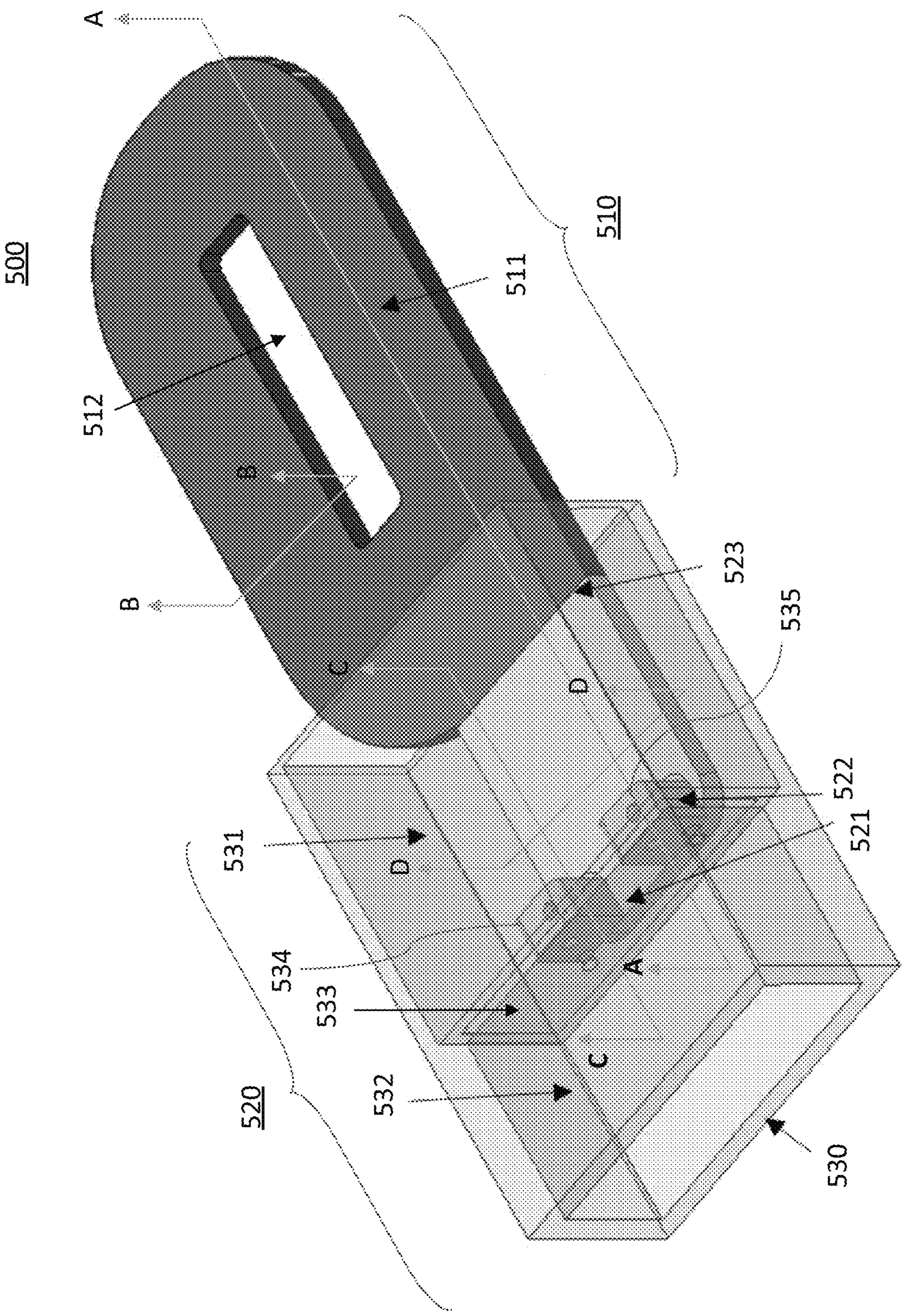
FIG. 5 illustrates a perspective view of a printed circuit board (PCB) based planar winding structure for a power transformer, in accordance with an embodiment of the present disclosure.

FIG. 5 illustrates a perspective view of a printed circuit board (PCB) based planar winding structure 500 for a power transformer, in accordance with an embodiment of the present disclosure. PCB-based planar winding structure 500 includes a winding portion 510 and a terminal portion 520.

Referring to FIG. 5, winding portion 510 includes a PCB board 511 having a substantially rectangular shape with rounded corners and a thickness of about 1 mm to 6 mm. In certain embodiments, PCB board 511 may include a through hole 512 formed at the central portion thereof to accommodate a magnetic core therein. Terminal portion 520 can be formed on an extended portion of PCB board 511 having a width narrower than (e.g., about one half of) the width of PCB board 511 in winding portion 510. Terminal portion 520 includes first and second terminals 521, 522 formed on the extended portion of PCB board 511 to direct electric current into and/or out of winding structure 500. In one embodiment, terminals 521, 522 can penetrate through PCB board 511 and be exposed exterior on both surfaces of PCB board 511. One or more conductive layers are embedded in PCB board 511 and electrically connected to first and second terminals 521, 522 to constitute a winding coil that surrounds through hole 512. Outer surface of winding portion 510 may be coated with a shielding layer with a shielding edge 523 at an interface before PCB board 511 is extended to terminal portion 520. It is appreciated that, depending on design choices, PCB board 511 and through hole 512 can have a planar structure of any appreciate shape (e.g., a rectangle shape, a circular shape, an oval shape, etc.) and any appropriate size.

Referring again to FIG. 5, in some embodiments, terminal portion 520 may optionally or additionally include a terminal housing 530 having first and second compartments 531, 532. First and second compartments 531, 532 can be separated by an insulating wall 533. As shown in FIG. 5, first compartment 531 receives first and second terminals 521, 522 and encloses the extended portion of PCB board 511. In one embodiment, first compartment 531 can be potted with an insulating material, such as, epoxy, to serve as a shielding edge treatment to smooth out electrical field to be further detailed below. It is appreciated that shielding edge 523 should be fully covered by the insulating material in first compartment 531.

Figure 15:
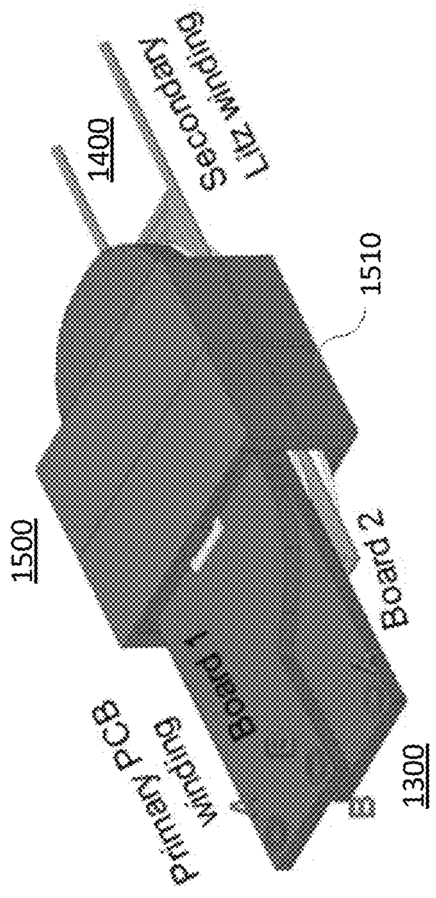
FIG. 15 illustrates a transformer assembly structure having the primary winding structure of FIG. 13, in accordance with an embodiment of the present disclosure.

Second compartment 532 includes a hollow space that provides the required creepage distance and electric bushing for connection with an external power source. Through holes may be formed on insulating wall 533, such that first and second terminals 521, 522 can be connected to the external power source. Terminal blocks 534, 535 (made of an electrically conductive material, e.g., metal) may be utilized to provide both electrical and mechanical support for the connection between the external power source and first and second terminals 521, 522. In one embodiment, metal screws (not shown) can be utilized to penetrate through insulating wall 533 and terminal blocks 534, 535. In some embodiment, when multiple PCB boards are connected in series as shown in FIG. 15, terminal housing 530 can be modified and applied at the transformer level after the assembly of the multiple PCB boards.

Figure 6:
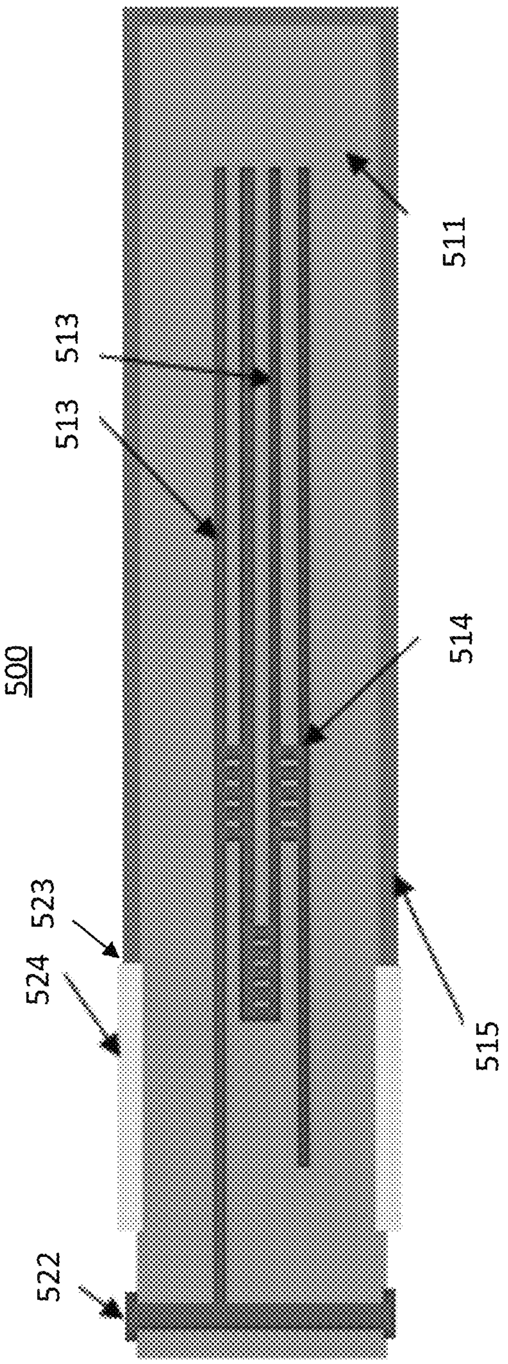
FIG. 6 illustrates a sectional view along line A-A of the PCB-based planar winding structure in FIG. 5, including shielding edge treatment, in accordance with an embodiment of the present disclosure.
Figure 7:
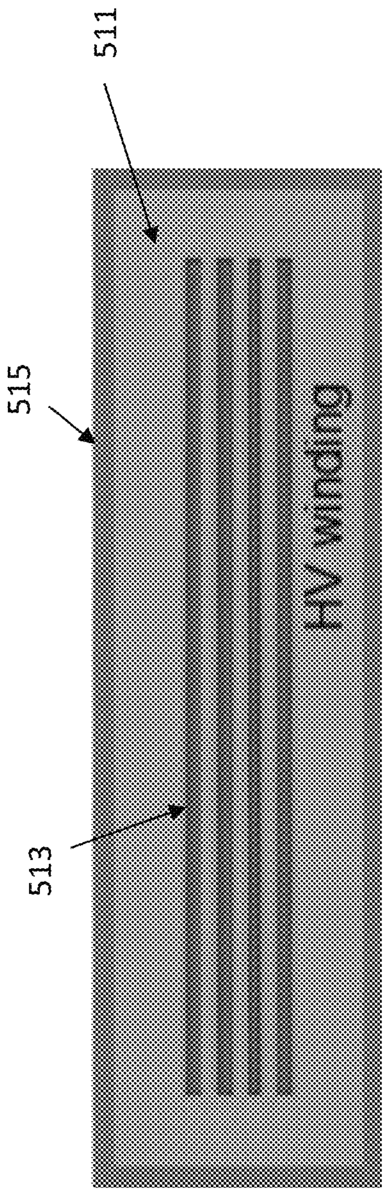
FIG. 7 illustrate a sectional view along line B-B of the PCB-based planar winding structure in FIG. 5, in accordance with an embodiment of the present disclosure.

FIG. 6 illustrates a sectional view along line A-A of PCB-based planar winding structure 500 in FIG. 5, including shielding edge treatment, in accordance with an embodiment of the present disclosure. FIG. 7 illustrate a sectional view along line B-B of PCB-based planar winding structure 500 in FIG. 5, in accordance with an embodiment of the present disclosure.

Referring to both FIGS. 6 and 7, in this embodiment, PCB-based planar winding structure 500 includes four conductive layers 513 (made of copper or other appropriate metal materials) connected in a cascaded manner and embedded in PCB board 511. It is appreciated that, depending on design choices, any appropriate number of conductive layers 513 can be used. As shown in FIGS. 6 and 7, in this embodiment, only inner layers are utilized for electric conduction as the high voltage winding. Conductive layers 513 are insulated in most part with each other by the PCB material of PCB board 511 and can be electrically connected using buried vias 514, which can be filled with epoxy. In one embodiment, PCB board 511 is made of an insulation material, e.g., FR4, to serve as insulation layers between conductive layers 513. PCB based FR4 material has been widely adopted in related industry for power or control board purposes. The quality and void defects can be well controlled inside the FR4 or between the FR4 to the internal copper layer and therefore the defect of internal Partial Discharge (PD) or the PD between layers can be minimized.

In one embodiment, exterior surfaces of PCB board 511 are coated with a shielding layer 515 that can be made of a semiconductive material, such as, carbon conductive paint. Semiconductive shielding layer 515 can share the same potential with the low voltage side. Accordingly, if shielding layer 515 terminates abruptly at shielding edge 523, a high electric stress will exist around shielding edge 523. To prevent such strong electrical field, in one embodiment, shielding edge treatment 524 may be required to smooth out the electrical field.

Figure 8:
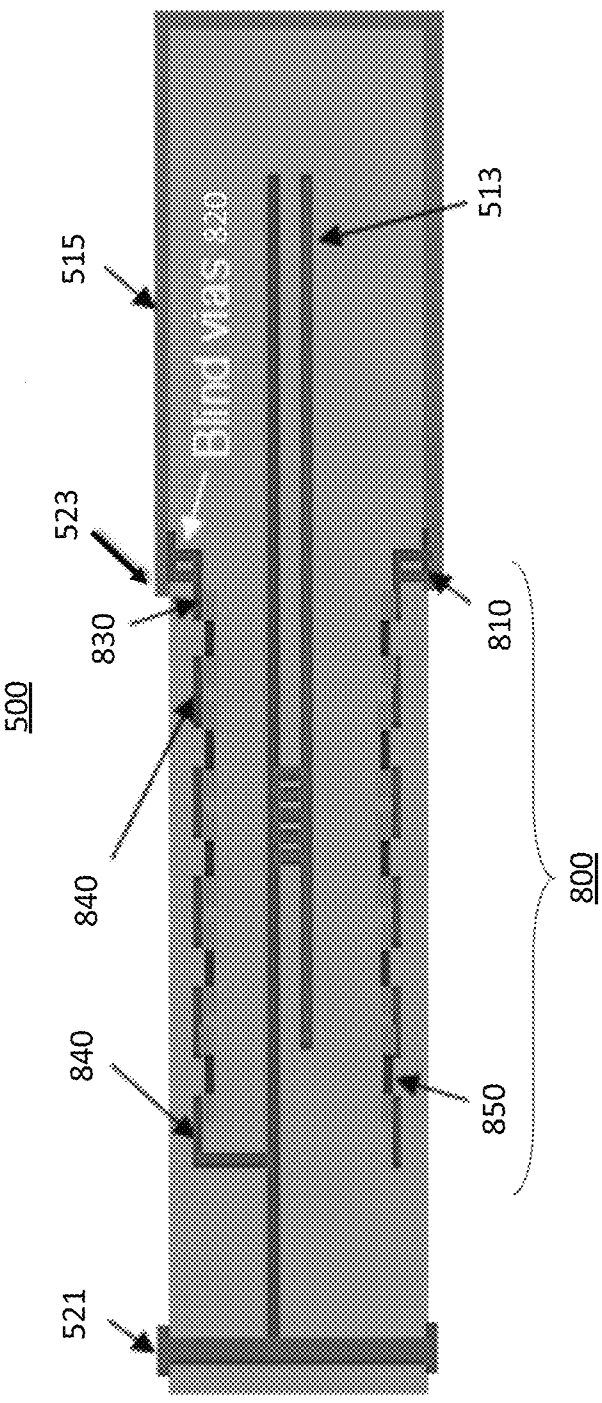
FIG. 8 illustrates a sectional view along line C-C of the PCB-based planar winding structure in FIG. 5, including a grading ring structure, in accordance with an embodiment of the present disclosure.
Figure 9:
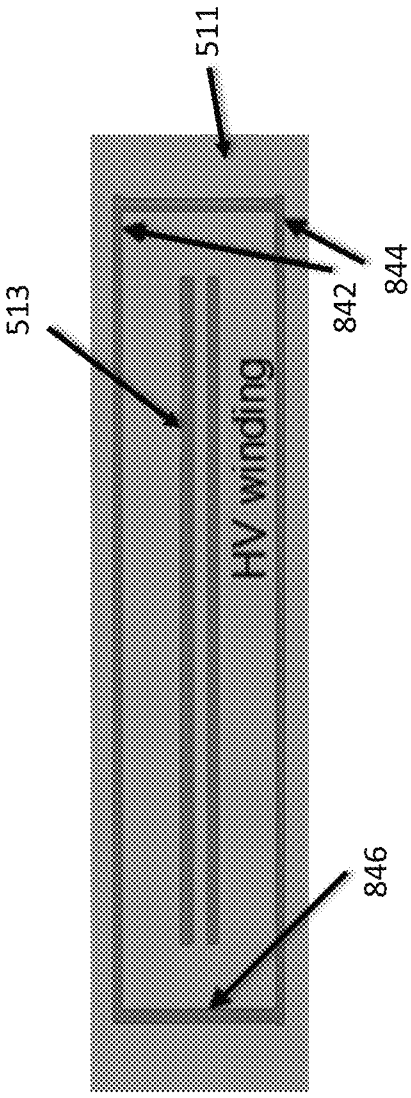
FIG. 9 illustrates a sectional view along line D-D of the PCB-based planar winding structure in FIG. 5, in accordance with an embodiment of the present disclosure.

FIG. 8 illustrates a sectional view along line C-C of PCB-based planar winding structure 500 in FIG. 5, including a grading ring structure 800, in accordance with an embodiment of the present disclosure. FIG. 9 illustrates a sectional view along line D-D of PCB-based planar winding structure 500 in FIG. 5, in accordance with an embodiment of the present disclosure.

Referring to both FIGS. 8 and 9, in this embodiment, grading ring structure 800 is introduced between conductive layers 513 and shielding layer 515 to reduce the electrical field stress. It is appreciated that grading ring structure 800 can reduce the electrical field stress alone or in combination with shielding edge treatment 524 in FIG. 6. In this embodiment, instead of ending the ground potential at shielding edge 523, the ground potential can be extended into the internal PCB structure through an external ground ring 810, blind vias 820, and an internal ground ring 830. External ground ring 810 is formed together with the PCB manufacturing process and can be considered as an external layer on an outer surface of PCB board 511. When shielding layer 515 is applied, it can cover external ground ring 810 and thus share the same ground potential. Blind vias 820 electrically connect the ground potential further down to internal ground ring 830 embedded in PCB board 511. As a result, the strong electric stress no longer exists on shielding edge 523 but exists on the edge of internal ground ring 830.

Because internal ground ring 830 is wrapped with a highly insulative material, the electric field exposed to the outside of PCB board 511 can be alleviated. However, the electric field may need to be further reduced, because the limited thickness of the insulation material (e.g., FR4) that covers internal ground ring 830 may not bring the electric field to a value below the air-breakdown value. Accordingly, the electric field may need to be further extended in a horizontal direction. In one embodiment, multiple embedded grading rings 840 can be implemented between internal ground ring 830 and first terminal 521 to provide controlled potential between each other. Grading rings 840 can be manufactured initially as a single piece, which is then etched to form multiple grading rings 840. This can bring down the electric field from a vertical direction to a horizontal direction dramatically and thus reduce the exposed stress on the exterior surface of PCB board 511. In one embodiment, the potential for each grading ring 840 can be controlled through embedded or buried resistors 850, respectively connected between neighboring grading rings 840. In certain embodiments, buries resistors 850 can have a resistance of about 10M Ohms.

As shown in FIG. 9, each of grading rings 840 includes an upper trace 842, a lower trace 844, and two buried vias 846, together forming a rectangular conductive loop that surrounds conductive layers 513. Resistors 850 between grading rings 840 can also have a rectangular loop shape. Upper trace 842, lower trace 844, buried vias 846 can be manufactured during the PCB manufacturing process and thus require minimum additional labor. Resistors 850 between grading rings 840 can also be manufactured during the PCB manufacturing process. In this embodiment, five equally separated grading rings 840, each having a rectangular closed loop, and five resistors 850 are shown and described. It is appreciated that any suitable number of grading rings 840 and resistors 850 having any suitable shapes and/or configurations can be formed to constitute grading ring structure 800. One of grading rings 840 that is the farthest from shielding edge 523 is electrically connected to one of conductive layers 513 or one of first and second terminals 521, 522.

Figure 10:
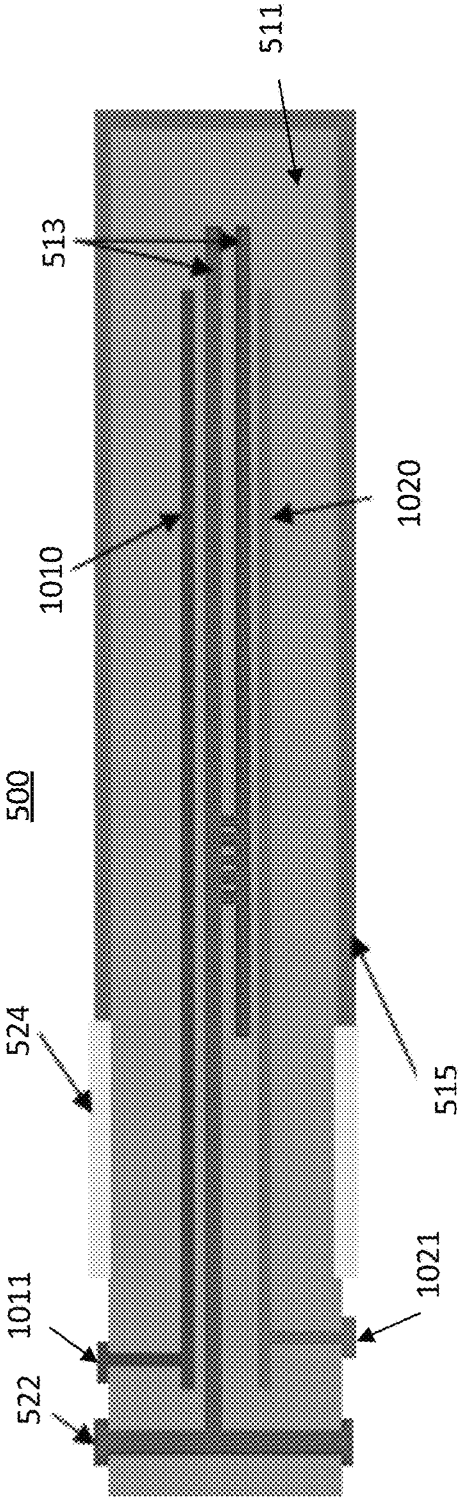
FIG. 10 illustrates a sectional view along line A-A of the PCB-based planar winding structure in FIG. 5, including embedded EMI-shielding layers, in accordance with an embodiment of the present disclosure.
Figure 11:
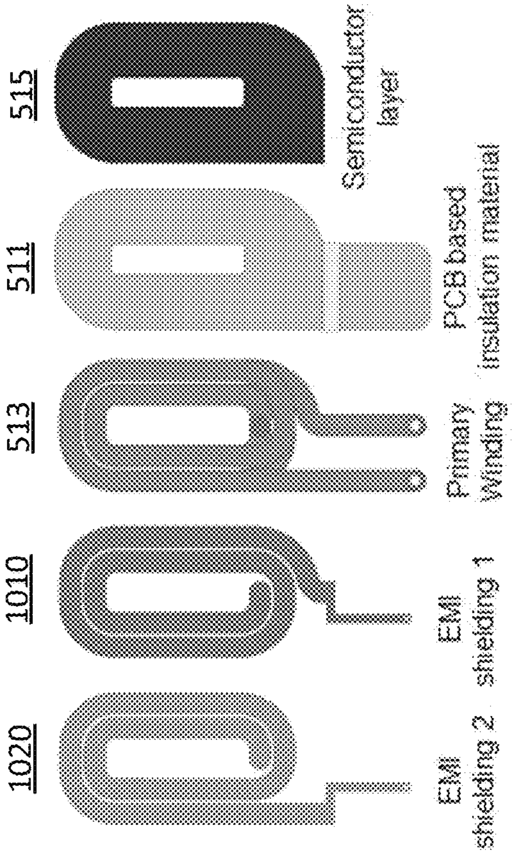
FIG. 11 illustrates a top view of the various layers of the PCB-based planar winding structure in FIG. 10.

The stray capacitance between primary and secondary sides of a power transformer can be determined by the high voltage winding (conductive layers 513) with respect to shielding layer 515, which shares the same potential with the low voltage side. Due to the relatively large footprint, the stray capacitance may not be insignificant. FIG. 10 illustrates a sectional view along line A-A of PCB-based planar winding structure 500 in FIG. 5, including embedded EMI shielding layers 1010, 1020, in accordance with an embodiment of the present disclosure. FIG. 11 illustrates a top view of the various layers of PCB-based planar winding structure 500 in FIG. 10.

PCB-based planar winding structure 500 as shown in FIG. 10 is substantially the same as that shown in FIG. 5, except that winding structure 500 in FIG. 10 additionally includes a first embedded EMI shielding layer 1010 disposed above and insulated from conductive layers 513, and a second embedded EMI shielding layer 1020 disposed below and insulated from conductive layers 513. First and second embedded EMI shielding layers 1010, 1020 can be electrically coupled to the outside of PCB board 511 respectively through first and second EMI shielding terminals 1011, 1021. EMI shielding layers 1010, 1020 inside of PCB board 511 provides a controlled EMI path for the high frequency electric noise and thus reduce the EMI level to the low voltage side.

Figure 12:
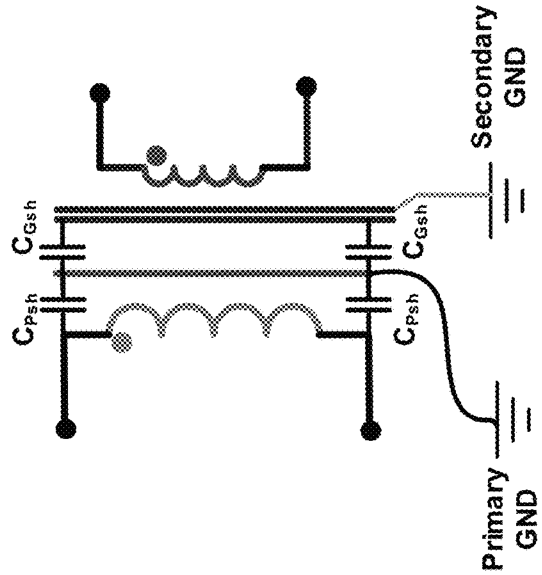
FIG. 12 illustrates an equivalent circuit of the PCB-based planar winding structure in FIG. 10.

FIG. 12 illustrates an equivalent circuit of PCB-based planar winding structure 500 in FIG. 10. EMI shielding layers 1010, 1020 create an equivalent capacitance $C_{Psh}$ with the high voltages winding (conductive layers 513) and an equivalent capacitance $C_{Gsh}$ with shielding layer 515. EMI shielding terminals 1011, 1021 can be connected back to the primary ground, such that the noise generated from the primary side can be circulated back to the primary side, thereby incurring less interaction with the transformer's secondary side.

Figure 13:
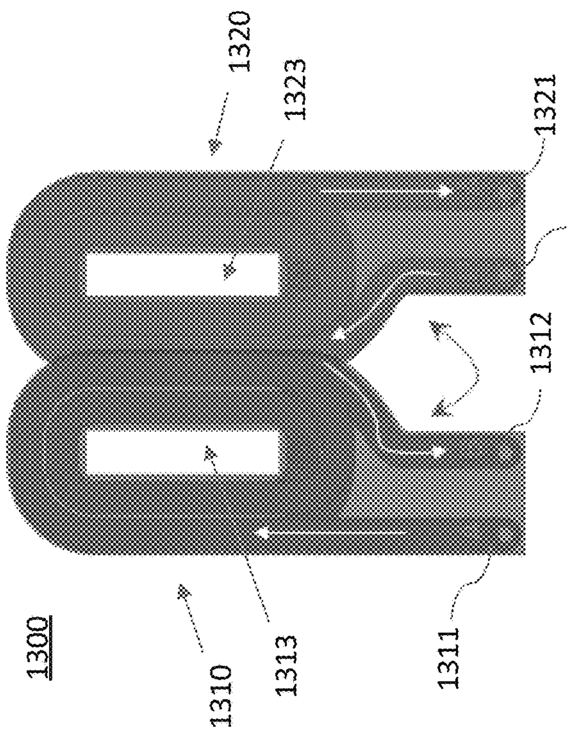
FIG. 13 illustrates a primary winding assembly structure including two identical planar winding modules, in accordance with an embodiment of the present disclosure.
Figure 14:
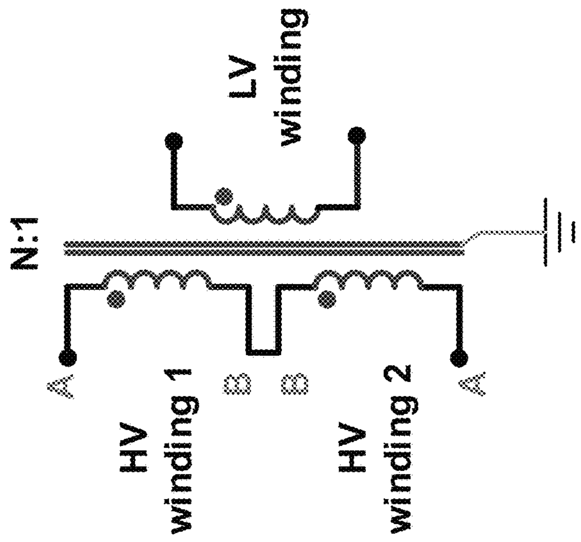
FIG. 14 illustrates an equivalent circuit of the primary winding assembly structure of FIG. 13.

FIG. 13 illustrates a primary winding assembly structure 1300 including two identical planar winding modules 1310, 1320, in accordance with an embodiment of the present disclosure. FIG. 14 illustrates an equivalent circuit of primary winding assembly structure 1300 of FIG. 13. FIG. 15 illustrates a transformer assembly structure 1500 having primary winding structure 1300 of FIG. 13, in accordance with an embodiment of the present disclosure.

Referring to FIGS. 13 through 15, in one embodiment, planar winding module 1310 includes terminals 1311, 1312, while planar winding module 1320 includes terminals 1321, 1322. When planar winding modules 1310, 1320 are combined to form primary winding assembly structure 1300, one of planar winding modules 1310, 1320 is flipped 180 degrees along a longitudinal axis thereof, such that planar winding modules 1310, 1320 can be stacked on top of one another with through holes 1313, 1323 being aligned with each other, and with terminals 1312, 1322 being aligned and electrically connected with each other. An external screw can be utilized to connect planar winding modules 1310, 1320 in series, an equivalent circuit of which is shown in FIG. 14. Secondary side winding 1400 can be made of a litz wire and the primary side two boards are connected in series. The arrangement of the primary side winding 1300 and the secondary side winding 1400 can be a side-by-side configuration as shown in FIG. 15, or an interleaved configuration (i.e., secondary side windings interleaved between primary side windings) depending on the required leakage inductance. By using the externally painted shielding layer, the shielding layer's electrical potential can be confined to low voltage level and thus no potting is required to fill the window area of a magnetic core 1510 of transformer assembly structure 1500, where the high voltage winding and low voltage winding are stacked even though the low voltage winding can still be litz wire.

Figure 16:
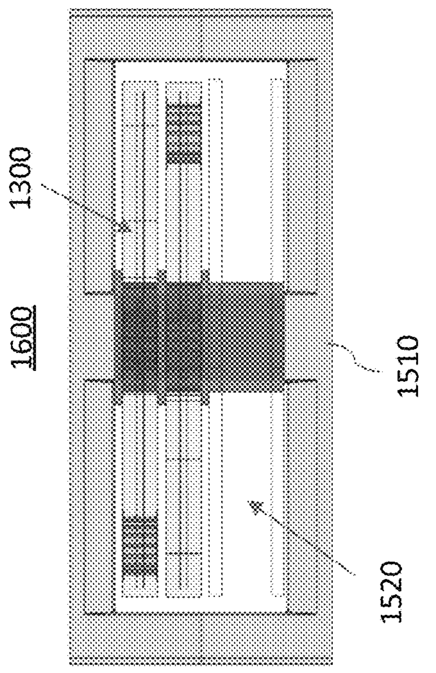
FIG. 16 illustrates a sectional view of an integrated conductive bobbin to hold the primary winding assembly structure of FIG. 13.

FIG. 16 illustrates a sectional view of an integrated conductive bobbin 1600 to hold primary winding assembly structure 1300 of FIG. 13. Bobbin 1600 can be electrically conductive or painted with a metal layer, so that shielding layers of primary winding assembly structure 1300 can be grounded and share the same potential with the low voltage side. As such, there is no need for the potting in window area 1520 of magnetic core 1510 and forced air cooling is possible to directly remove the heat generated from primary winding assembly structure 1300, with excellent thermal benefits.

As discussed before, other than the main power transformer, auxiliary power transformers are also widely utilized in medium voltage applications. For an auxiliary power transformer, a lower profile (especially a smaller height) is desired to fit into the power stage enclosure. For a planar structure design, the height for the transformer is typically defined by the magnetic core. Accordingly, the potential between the cores and the enclosure needs to be well controlled. Further, these applications also require a minimum stray capacitance between the primary side and the secondary side to reduce the coupling from the power stage to the control stage. Moreover, most of the auxiliary power transformers do not need to handle high power, thereby making it possible to integrate both the primary side and the secondary side into one PCB.

Figure 18:
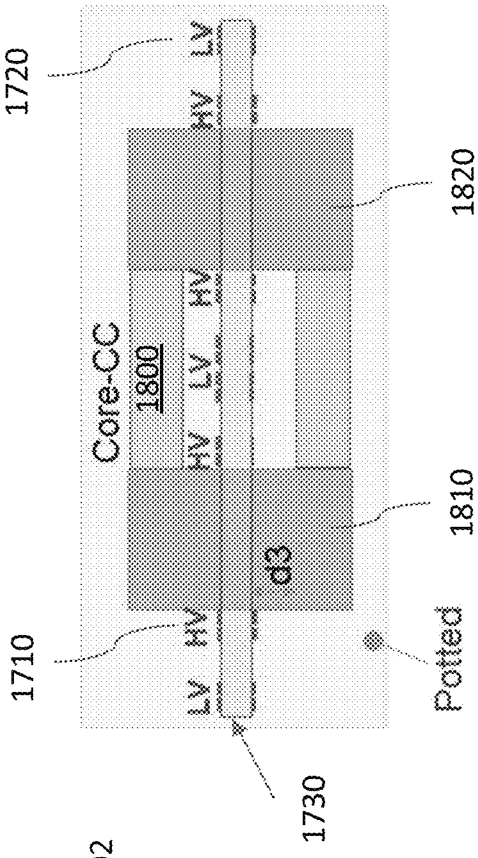
FIGS. 17 and 18 respectively illustrate a top view and a sectional view of a planar winding structure that integrates both HV windings and LV windings on the same PCB to achieve smaller electric field, in accordance with an embodiment of the present disclosure.
Figure 17:
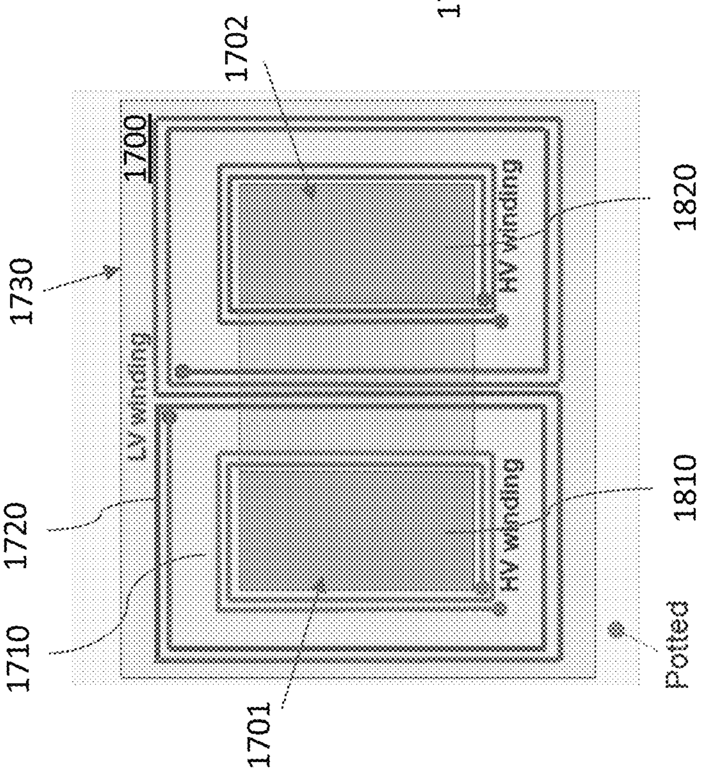

FIGS. 17 and 18 respectively illustrate a top view and a sectional view of a planar winding structure 1700 that integrates both HV windings 1710 and LV windings 1720 on the same PCB 1730 to achieve a smaller electric field, in accordance with an embodiment of the present disclosure. As shown in FIGS. 17 and 18, planar winding structure 1700 includes first and second through holes 1701, 1702 and can be utilized with a CC-type magnetic core 1800 to form a transformer. HV windings 1710 are wound around through holes 1701, 1702 and very close to two legs 1810, 1820 of magnetic core 1800. LV windings 1720 are wound around through holes 1701, 1702 and are further away from legs 1810, 1820 in a pattern similar to that of HV windings 1710 but are connected in series. HV windings 1710 and LV windings 1720 are spatially separated on PCB 1730. A gap can be formed between HV and LV windings 1710, 1720 and the top and bottom surfaces of magnetic core 1800. Because HV windings 1710 are very close to magnetic core 1800, the potential of magnetic core 1800 can be controlled very close to the HV side which makes the electric field mostly concentrated at the center area from HV to LV.

In one embodiment, magnetic core 1800 and planar winding structure 1700 can be potted with epoxy or other insulation material for both mechanical support and PD free. Because there is no litz wire, high viscosity potting material can be utilized. Meanwhile, because the core potential is well controlled, the potted housing height can be very close to the core height, because there is no strong electric field around the top or bottom of the core.

Figure 19:
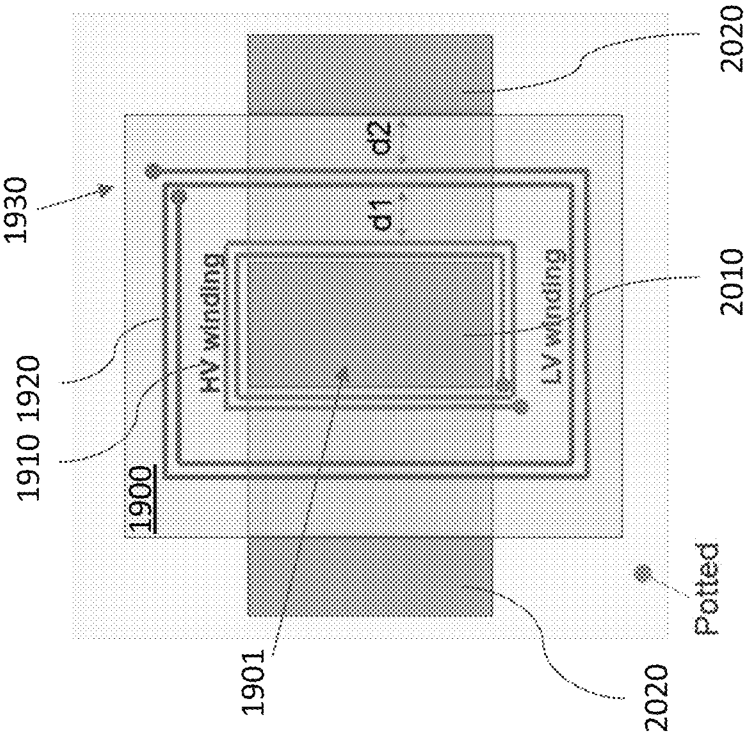
FIGS. 19 and 20 respectively illustrate a top view and a sectional view of another planar winding structure that integrates both HV windings and LV windings on the same PCB to achieve smaller electric field, in accordance with an embodiment of the present disclosure.
Figure 20:
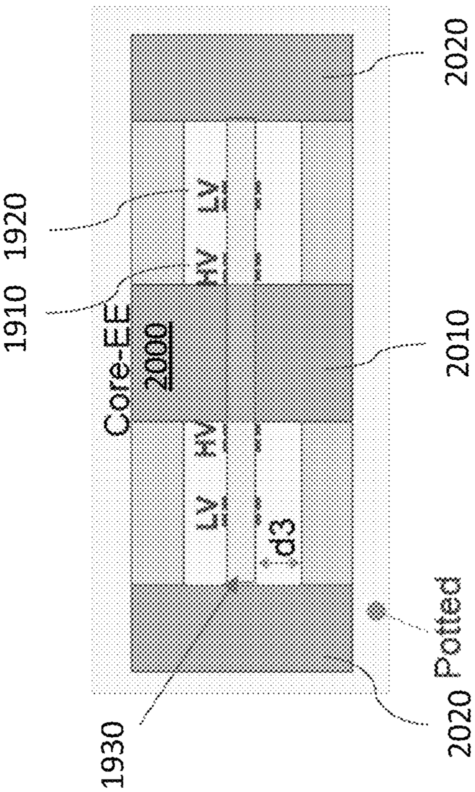

FIGS. 19 and 20 respectively illustrate a top view and a sectional view of another planar winding structure 1900 that integrates both HV windings 1910 and LV windings 1920 on the same PCB 1930 to achieve smaller electric field, in accordance with an embodiment of the present disclosure. As shown in FIGS. 19 and 20, planar winding structure 1900 includes a through hole 1901 and can be utilized with an EE-type magnetic core 2000 to form a transformer. HV windings 1910 are wound very close to a central leg 2010 of magnetic core 2000. LV windings 1920 are wound around central leg 2010 of core 2000, with a first distance d1 from a periphery of through hole 1901 (or from central leg 2010 of magnetic core 2000) and a second distance d2 from an edge of planar winding structure 1900 (or from side legs 2020 of magnetic core 2000. In various embodiments, first and second distances d1 and d2 may be the same or slightly different (e.g., within a percentage difference of less than 20%). A gap having a third distance d3 can be formed between HV and LV windings 1910, 1920 and the top and bottom surfaces of the window area of magnetic core 2000.

Figure 22:
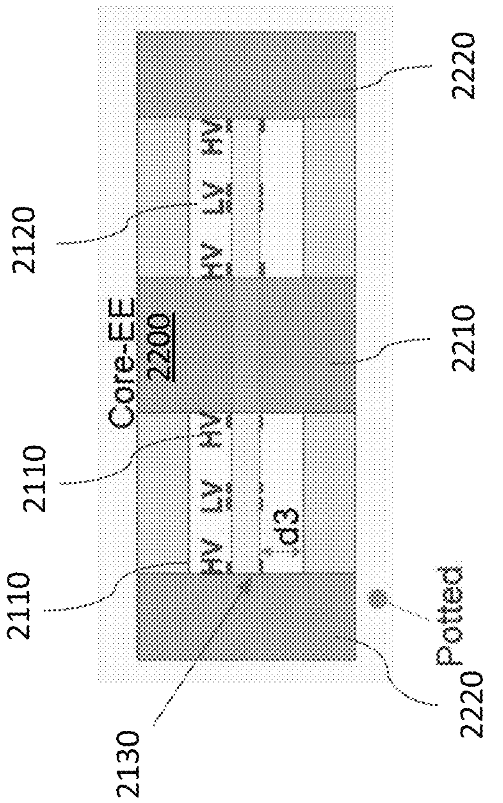
FIGS. 21 and 22 respectively illustrate a top view and a sectional view of yet another planar winding structure that integrates both HV windings and LV windings on the same PCB to achieve smaller electric field, in accordance with an embodiment of the present disclosure.
Figure 21:
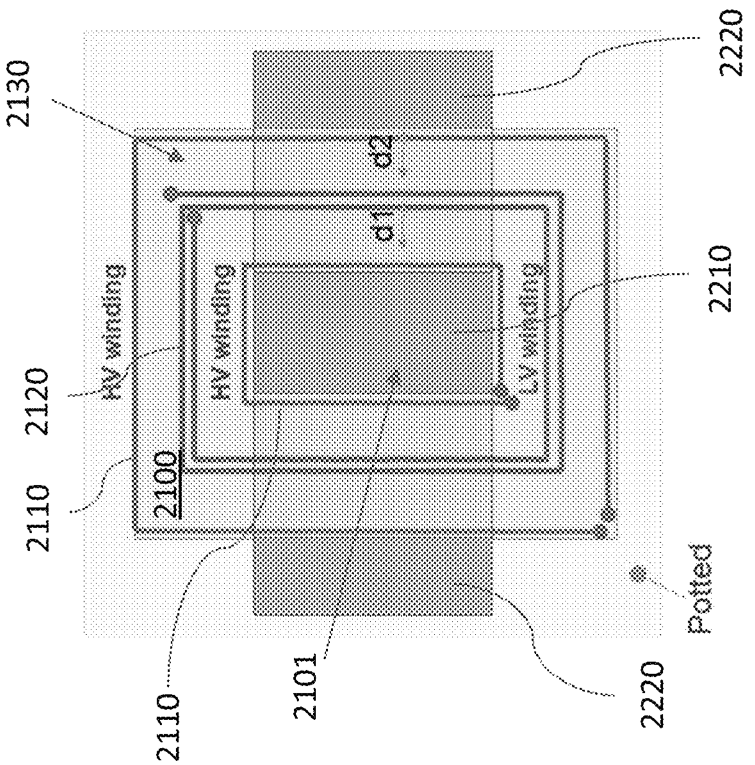

FIGS. 21 and 22 respectively illustrate a top view and a sectional view of yet another planar winding structure 2100 that integrates both HV windings 2110 and LV windings 2120 on the same PCB 2130 to achieve smaller electric field, in accordance with an embodiment of the present disclosure. As shown in FIGS. 21 and 22, planar winding structure 2100 can be utilized with a EE-type magnetic core 2200 to form a transformer. Planar winding structure 2100 in FIGS. 21 and 22 is substantially the same as planar winding structure 1900 in FIGS. 19 and 20, except that planar winding structure 2100 includes two sets of HV windings, a first set being very close to central leg 2210 of magnetic core 2200, while a second set being very close to side legs 2220 of magnetic core 2200. LV windings 2120 are wound around central leg 2010 of magnetic core 2200 at a first distance d1 from a periphery of through hole 2101 (or from central leg 2210) and a second distance d2 from an edge of planar winding structure 2100 (or from side legs 2220). In one embodiment, first and second distances d1 and d2 may be the same or slightly different (e.g., within a percentage difference of less than 20%). A gap having a third distance d3 can be formed between HV and LV windings 2110, 2120 and the top and bottom surfaces of the window area of magnetic core 2200.

Figure 23:
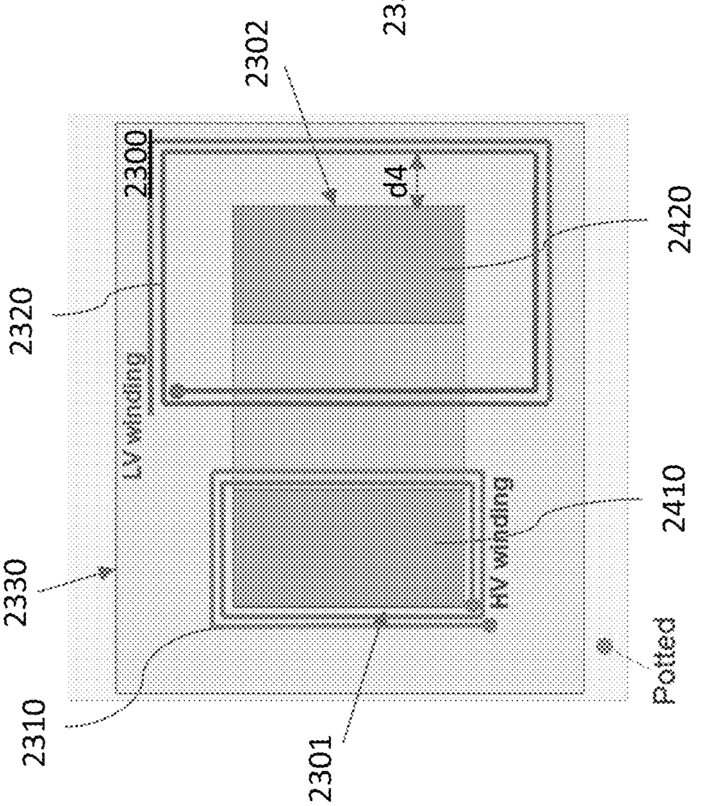
FIGS. 23 and 24 respectively illustrate a top view and a sectional view of still another planar winding structure that integrates both HV windings and LV windings on the same PCB to achieve a smaller electric field, in accordance with an embodiment of the present disclosure.
Figure 24:
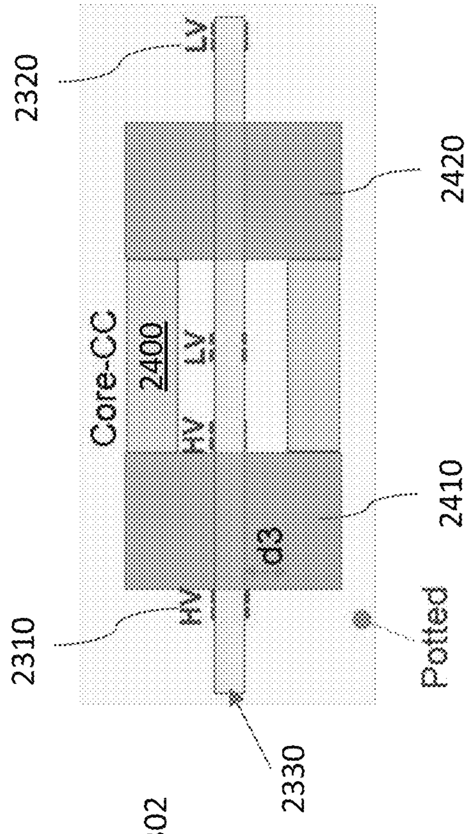

FIGS. 23 and 24 respectively illustrate a top view and a sectional view of a planar winding structure 2300 that integrates both HV windings 2310 and LV windings 2320 on the same PCB 2330 to achieve a smaller electric field, in accordance with an embodiment of the present disclosure. As shown in FIGS. 23 and 24, planar winding structure 2300 includes first and second through holes 2301, 2302 and can be utilized with a CC-type magnetic core 2400 to form a transformer. HV windings 2310 are wound around through hole 2301 and very close to a periphery of through hole 2301 or a first leg 2410 of magnetic core 2400. LV windings 2320 are wound around through hole 2302 at a distance d4 away from a second leg 2420 of magnetic core 2400. A gap having a third distance d3 can be formed between HV and LV windings 2310, 2320 and the top and bottom surfaces of the window area of magnetic core 2200.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed modified by a term of degree (e.g., "about"), thereby reflecting its intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. A planar winding structure, comprising:

an insulating planar board having a winding portion and a terminal portion, with a through hole at a central portion of the winding portion;

a plurality of conductive layers embedded in the winding portion of the insulating planar board and electrically connected with each other through one or more buried vias, the conductive layers being patterned to constitute a transformer winding around the through hole;

first and second terminals at the terminal portion of the insulating planar board, each being electrically connected to a respective one of the conductive layers;

a shielding layer coated on outer surfaces of the winding portion of the insulating planar board; and a grading ring structure embedded in the terminal portion of the insulating planar board, wherein the grading ring structure and the shielding layer share a same potential.

2. The planar winding structure of claim 1, further comprising an insulating material in the terminal portion between the shielding layer and the first and second terminals.

3. The planar winding structure of claim 1, further comprising an electric bushing having a potted part and a hollow part, wherein the terminal portion of the insulating planar board is accommodated within the potted part.

4. The planar winding structure of claim 3, the electric bushing further comprises terminal blocks in the potted part to electrically and mechanically support the first and second terminals.

5. The planar winding structure of claim 1, wherein the grading ring structure comprises an external ground ring on an outer face of the insulating planar board proximate an interface of the winding portion and the terminal portion and an internal ground ring embedded in the insulating planar board and electrically connected with the external ground ring through one or more blind vias.

6. The planar winding structure of claim 1, wherein the grading ring structure comprises a plurality of grading rings embedded in the terminal portion of the insulating planar board and extending in a horizontal direction from an interface of the winding portion and the terminal portion, and at least a resistor embedded in the insulating planar board and electrically connected to neighboring ones of the grading rings.

7. The planar winding structure of claim 6, wherein one of the grading rings that is farthest from the interface is electrically connected to one of the first and second terminals.

8. The planar winding structure of claim 1, further comprising EMI shielding layers embedded in the insulating planar board, wherein the conductive layers are embedded in the insulating planar board between the EMI shielding layers.

9. The planar winding structure of claim 1, wherein the shielding layer comprises a semiconductive material.

10. The planar winding structure of claim 1, wherein the insulating planar board comprises a FR4 material.

11. A power transforming comprising the planar winding structure of claim 1, a magnetic core, and a secondary winding structure magnetically coupled to the planar winding structure through the magnetic core.

12. The power transforming of claim 11, wherein a portion of the magnetic core is disposed in the through hole of the insulating planar board.

13. The power transforming of claim 11, wherein the secondary winding structure is electrically connected to the shielding layer of the planar winding structure.

* * * * *